E. Nott.
Refining Iron & Steel.
BEST AVAILABLE COPY
Se 2" 7,641 X.
(Vol 17 Reissued patents, p 189)
Patented Jun. 29, 1833.
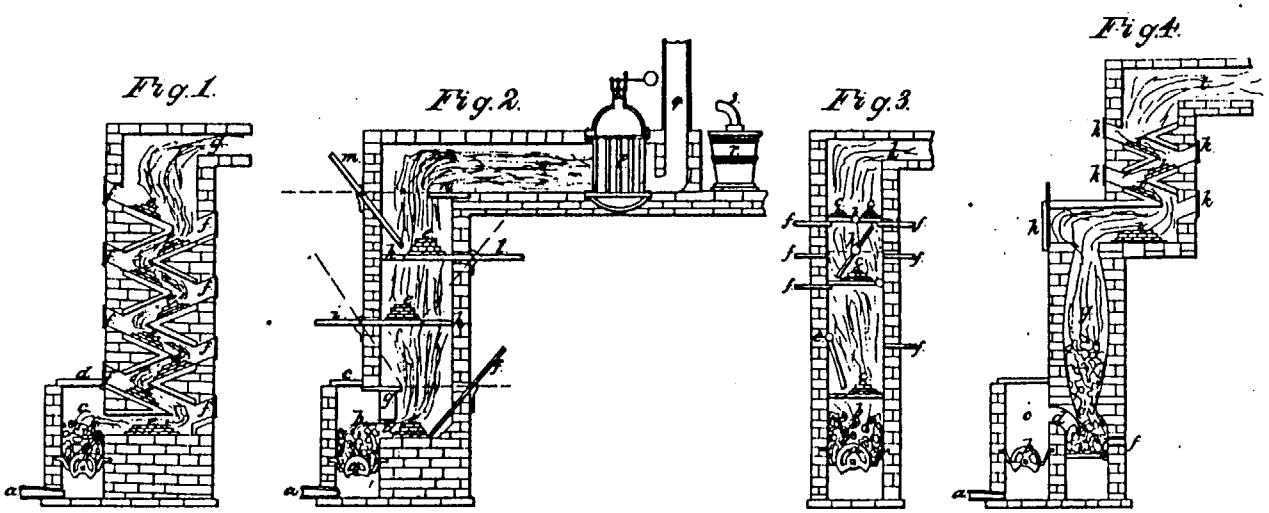

7641X June 29. 1833

Case "7"

Eliphalet Nott.

Letters Patent.

The schedule referred to in these Letters Patent, & making
part of the same, containing a description in the words of
the said Eliphalet Nott himself of his improvement in the
material combination and confinement in place of the damper
& handle as employed in common stove pipe.

---

Case "No. 7."

Specification of an improvement made in the material used
for dampers and handles, & in the manner of combining the same in com-
mon stove pipes.— Whereas inconvenience has arisen from the warp-
ing & corroding of dampers & handles in common stove pipes when
made, the one of sheet & the other of wrought iron; therefore an im-
provement has been introduced & the same having been per-
fected & tested by repeated experiment is intended to be intro-
duced into general use, which improvement consists in making
use of cast iron for said purposes; & which (if the adjustment
be wholly in the pipe itself) may be effected by employing a cast
iron circular flat for a damper, the central zone across which to
the extent of about one half of an inch in breadth is divided
transversely into three parts in such manner, that the interior
part is equal to the two exterior ones.— & by removing the whole of
which parts from the plane of the residue of the flat by depressing
the interior part & elevating the two exterior ones (or vice versa)
in such manner & to such an extent that a space shall be left
in the plane of the flat for the insertion of the handle in place,
which handle also to be of cast iron & to carry on the larger
end a knob head or other projection for turning the same & having
on the smaller end, a groove for receiving after insertion in the
pipe, the edge thereof which being [illegible] down will [illegible]
confine confine the same; but which, if the adjustment be partly in the rim of the open cover on which the pipe stands, & partly in the pipe itself may be effected by casting the damper & handle together & adjust=ing the same in said rim & setting the pipe thereon & surrounding the whole by a base moulding cast separately; sockets being previously formed in said rim for the underside of the journals of the handle to work in & the lower margin of the pipe & of the base moulding which set down over said handle being hollowed out for the upper side of the journals to work in. For further information, reference must be had to the drawings & explanations hereunto appended. Summary The improvement above contemplated consists in preventing the warping and corroding of dampers & handles in common stove pipe by making use of cast iron therefor; & in confining the same, if the adjustment be wholly in the pipe itself by inserting the handle in the space left by removing one portion of a central zone in the damper in one direction, & another portion in the opposite direction; & confining the same when in place by rimming the edge of the pipe after being pierced into the groove at the extremity of the handle piercing it. But if the adjustment be partly in the rim of the open cover on which the pipe rests, and partly in the pipe itself, then the improvement consists in casting the damper & handle entire, & in adjusting the same in said rim, & in setting the pipe there=on, & surrounding the same with a base moulding in manner aforesaid. I therefore claim as my invention & improvement the preventing of the warping & corroding of dampers & handles in common stove pi[illegible] by making use of cast iron in the construction of the same; & when so constructed, in combining & retaining the same in place in manner aforesaid.— together with the uses to which the same has been or may hereafter be applied in stove pipe. —

[illegible]
Witnesses
G. F. Yates
D. Boyd

Eliphalet Nott (Granted 29. Jun. 1833.)

(Patent)

[illegible]